(12) United States Patent
Wang et al.

(10) Patent No.: US 9,026,064 B2
(45) Date of Patent: May 5, 2015

(54) DYNAMIC CANCELLATION OF PASSIVE INTERMODULATION INTERFERENCE

(75) Inventors: Meng Wang, Solna (SE); Shaohua Li, Beijing (CN); Robert Baldemair, Solna (SE); Jung-Fu Cheng, Fremont, CA (US); Farshid Ghasemzadeh, Sollentuna (SE); Magnus Larsson, Sollentuna (SE); Johan Sköld, Solna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 152 days.

(21) Appl. No.: 13/319,556

(22) PCT Filed: Sep. 9, 2011

(86) PCT No.: PCT/SE2011/051097
§ 371 (c)(1),
(2), (4) Date: Nov. 9, 2011

(87) PCT Pub. No.: WO2012/161632
PCT Pub. Date: Nov. 29, 2012

(65) Prior Publication Data
US 2012/0295558 A1 Nov. 22, 2012

Related U.S. Application Data

(60) Provisional application No. 61/488,187, filed on May 20, 2011.

(51) Int. Cl.
*H04B 15/00* (2006.01)
*H04B 1/40* (2006.01)
(Continued)

(52) U.S. Cl.
CPC ............... *H04B 1/109* (2013.01); *H04B 1/123* (2013.01); *H04B 1/525* (2013.01)

(58) Field of Classification Search
CPC .......... H04B 15/00; H04B 1/40; H04B 25/03; H04B 1/10; H04B 1/48; H04B 17/00; H03F 1/26; H03F 1/30; H04R 29/00; H04R 3/00

USPC ............ 455/63.1, 67.13, 67.14, 114.2, 115.1, 455/115.2, 278, 296, 67.11–67.7, 130, 455/278.1, 283, 285, 302; 375/296; 340/572.5, 572.8, 10.1, 10.2, 10.51
See application file for complete search history.

(56) References Cited

U.S. PATENT DOCUMENTS 5,590,411 A * 12/1996 Sroka et al. ...................... 455/78
6,229,992 B1 * 5/2001 McGeehan et al. ............. 455/78
(Continued)

FOREIGN PATENT DOCUMENTS

WO 2009082084 A1 7/2009

OTHER PUBLICATIONS

Lui, P.L. "Passive Intermodulation Interference in Communication Systems." Electronics & Communication Engineering Journal, vol. 2, No. 3, 1990, pp. 109-118.
(Continued)

*Primary Examiner* — Edward Urban
*Assistant Examiner* — Ralph H Justus
(74) *Attorney, Agent, or Firm* — Coats & Bennett, PLLC

(57) ABSTRACT

A wireless communication node (10) dynamically estimates passive intermodulation (PIM) interference coupled into the node's receive path from the transmission of a composite signal through the node's transmit path. The node (10) then cancels the estimated PIM interference in the receive path. In some embodiments, the node dynamically estimates the PIM interference as a function of the composite signal that models PIM interference generation and coupling in the node (10) according to one or more coefficients (30). The coefficients (30) may be determined by transmitting a test signal (34) during a test stage, when the node (10) is not scheduled to receive any signal. Later, when the composite signal (18) is transmitted, the node (10) uses the coefficients (10) to dynamically estimate and cancel the resulting PIM interference.

22 Claims, 8 Drawing Sheets

(51) Int. Cl.
    *H04B 1/10*     (2006.01)
    *H04B 1/12*     (2006.01)

(56) References Cited

U.S. PATENT DOCUMENTS

| | | | |
|---|---|---|---|
| 6,288,814 B1* | 9/2001 | Blauvelt | 398/193 |
| 6,311,045 B1* | 10/2001 | Domokos | 455/78 |
| 7,113,744 B1* | 9/2006 | Moloudi et al. | 455/20 |
| 7,456,747 B2* | 11/2008 | Kung | 340/572.5 |
| 8,170,487 B2* | 5/2012 | Sahota et al. | 455/63.1 |
| 2004/0048576 A1 | 3/2004 | Hildebrand et al. | |
| 2004/0171351 A1* | 9/2004 | Nakazawa et al. | 455/67.13 |
| 2007/0184782 A1* | 8/2007 | Sahota et al. | 455/63.1 |
| 2008/0101619 A1* | 5/2008 | Shmunk | 381/59 |
| 2009/0068974 A1* | 3/2009 | Smith | 455/304 |
| 2009/0325509 A1 | 12/2009 | Mattisson et al. | |
| 2011/0075754 A1* | 3/2011 | Smith | 375/285 |
| 2011/0095819 A1* | 4/2011 | Velazquez | 330/149 |

OTHER PUBLICATIONS

Jung, H. et al. "Random Spacing Channel Assignment to Reduce the Nonlinear Intermodulation Distortion in Cellular Mobile Communications." IEEE Transactions on Vehicular Technology, vol. 48, No. 5, Sep. 1999, pp. 1666-1675.

3rd Generation Partnership Project. "On Passive Intermodulation (PIM) for MSR-NC." 3GPP TSG-RAN WG4 meeting #58, R4-111321, Taipei, Taiwan, Feb. 21-25, 2011.

Henrie, J. et al. "Cancellation of Passive Intermodulation Distortion in Microwave Networks." Proceedings of the 38th European Microwave Conference, Oct. 2008, Amsterdam, The Netherlands, pp. 1153-1156.

Foster, D.E. "A New Form of Interference—External Cross Modulation." RCA Review: A Quarterly Journal of Radio Progress, 1937, vol. 1, pp. 18-25.

Wu, Y.-S. et al. "A Study of Nonlinearities and Intermodulation Characteristics of 3-Port Distributed Circulators." IEEE Transactions on Microwave Theory and Techniques, vol. MTT-24, No. 2, Feb. 1976, pp. 69-77.

* cited by examiner

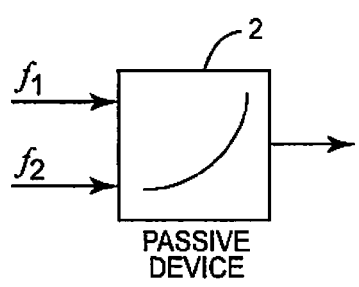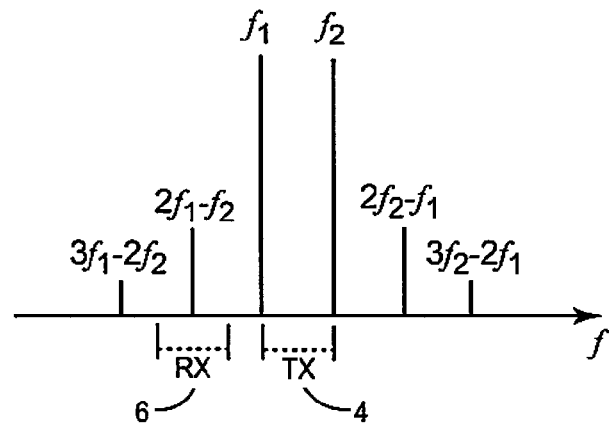
FIG. 1A  FIG. 1B

DYNAMIC CANCELLATION OF PASSIVE INTERMODULATION INTERFERENCE

RELATED APPLICATIONS

This application claims priority from U.S. Provisional Patent Application Ser. No. 61/488,187, which was filed on 20 May 2011, was entitled "Passive Intermodulation Cancellation in Wideband Communication Systems," and is incorporated herein by reference in its entirety.

TECHNICAL FIELD

The present invention generally relates to passive intermodulation (PIM) interference in a wireless communication node, and particularly relates to dynamic estimation and cancellation of that PIM interference.

BACKGROUND

Passive Intermodulation (PIM) is a form of interference that occurs in a wireless communication node when that node simultaneously transmits signals at multiple frequencies through passive devices. P. L. Liu, "Passive Intermodulation Interference in Communication Systems," *Electronics & Communication Engineering Journal*, Vol. 2, No. 3, 1990, pp. 109-118. Such passive devices may include, for instance, cables, connectors, antennas, and other such devices included in a node's transmit path. Many wireless communication nodes include such passive devices, but PIM interference proves particularly pronounced in nodes that transmit at high power.

The mechanisms that cause PIM interference are complex, but they can generally be divided into two major categories. The first category includes metal-to-metal contacts, including imperfect metal contacts, oxidized or contaminated contact surfaces, dissimilar metals in contact, and so on. D. E. Foster, "A new form of interference—external cross modulation," *RCA Review*, 1:18-25, 1937. The second category includes material nonlinearity, including magnetic materials in the signal path, temperature variation, etc. Y.-S. Wu, W. H. Ku, and J. E. Erickson, "A study of nonlinearities and intermodulation characteristics of 3-port distributed circulators," *IEEE Transactions on Microwave Theory and Techniques*, 24:69-77, 1976.

Regardless of the particular mechanism causing PIM interference, such interference degrades receiver sensitivity. Consider the example in FIGS. 1A-1B. In this simple example, a wireless communication node simultaneously transmits two signals at different frequencies $f_1$ and $f_2$ through a passive device 2 with a non-linear response. Although the signals are specifically transmitted in the node's transmit (TX) band 4, the transmission generates PIM that spreads over the frequency spectrum. Of particular concern, some components of PIM leak or couple into the node's receive (RX) band 6. These PIM components appear as interference to the node's receiver.

In more detail, FIG. 1B shows that the odd-order PIM components remain close to the TX band 4 and pose a particular threat to the RX band 6. The 3rd-order components (e.g., $2f_1-f_2$ and $2f_2-f_1$), in particular, have the highest possibility of coupling into the RX band 6, especially if $f_1$ and $f_2$ are separated by a large frequency gap. Moreover, these 3rd-order components have powers that are significantly higher than that of other odd-order components.

PIM components do not usually couple into the receive band in this manner in 3rd generation (3G) wideband communication systems such as the Universal Terrestrial Radio Access Network (UTRAN). This is because these systems use limited Radio Frequency (RF) bandwidth compared to the spacing between transmit and receive bands, so that third-order components of transmitter signals in particular fall outside the receive band. However, PIM components do couple directly into the receive band in other systems. Because these PIM components cannot be suppressed by filtering, the interference must be addressed in other ways.

PIM interference is addressed in narrowband communication systems, such as Global System for Mobile communications (GSM), by band planning and frequency hopping. H. Jung and O. K. Tonguz, "Random spacing channel assignment to reduce the nonlinear intermodulation distortion in cellular mobile communications," *IEEE Transactions on Vehicular Technology*, Vol. 48, No. 5, 1999. This simple technique, however, does not adequately address PIM interference in communication systems that use very wide bandwidth, such as Long Term Evolution (LTE)/LTE Advanced systems, or that use techniques involving multiple frequency bands (e.g., Multi-Standard Radio in Non-Continuous spectrum (MSR-NC) and LTE Carrier Aggregation (CA) systems). $3^{rd}$ Generation Partnership Project (3GPP) R4-111321, "On Passive Intermodulation (PIM) for MSR-NC," Ericsson, February 2011. Indeed, band planning cannot provide enough isolation in these systems to prevent PIM components from coupling into the receive band.

Several alternatives have nonetheless developed in an attempt to address PIM interference. In one approach, the passive devices themselves are designed and manufactured so that they cause less pronounced PIM interference. High costs and design constraints, however, limit the practicality of this approach. Moreover, other factors such as a predominant use of re-cycled metals readily inhibit the performance gains that can be achieved with the approach.

In another approach, engineered PIM sources are added into the node's transmit path. These engineered PIM sources are designed to statically compensate for PIM generated by passive devices. Henrie, A. Christianson, and W. J. Chappell, "Cancellation of Passive Intermodulation Distortion in Microwave Networks," in *European Microwave Conference*, Amsterdam, The Netherlands, 2008. This approach, however, requires additional hardware that is prohibitive in current communication systems. Even more problematic is that this approach fails to adequately address PIM because the engineered sources cannot dynamically track and compensate for the PIM interference, which varies over time.

SUMMARY

One or more embodiments herein include an apparatus and method for dynamically estimating and cancelling PIM interference in a wireless communication node, for better receiver performance in wideband systems.

More particularly, a wireless communication node herein dynamically estimates PIM interference coupled into the node's receive path from the transmission of a composite signal through the node's transmit path. The node then cancels the estimated PIM interference in the receive path. In some embodiments, for instance, the node simply subtracts the PIM interference estimate from the received signal, to obtain a corrected signal with reduced PIM interference.

In some embodiments, the node dynamically estimates the PIM interference as a function of the composite signal. A number of different functions may be used in this regard, but in at least one embodiment the function includes one or more coefficients that model generation of PIM interference in the transmit path and coupling of PIM interference from the transmit path into the receive path.

The coefficients may be determined during a test stage, so that, later, when the composite signal is transmitted, the node can use the coefficients to dynamically estimate and cancel the resulting PIM interference. Thus, in these embodiments, the node transmits a test signal when the node is not scheduled to receive any signal, measures the resulting interference, and estimates the coefficients as a function of the test signal and the measured interference. Then, when the composite signal is transmitted, the node dynamically estimates the PIM interference using a function of the composite signal that models PIM interference generation and coupling in the node according to the coefficients.

These coefficients may be periodically updated to reflect the varying nature of PIM generation at the node. The node may also dynamically tune the actual process by which it determines the coefficients. As one example of such tuning, the node may periodically adjust the number of coefficients used to model PIM interference generation and coupling in the node. In this regard, the choice of how many coefficients to use may depend on the particular configuration of the node (e.g., the bandwidth of the node's receiver) and/or a balance between cancellation performance and computational cost. In some embodiments, this balance is dynamically struck based on the actual cancellation performance being achieved.

Further, one or more embodiments herein selectively apply PIM interference cancellation under certain conditions. In one embodiment, PIM interference cancellation is selectively employed based on error rate feedback. In another embodiment, PIM interference cancellation is selectively employed based on interference statistics.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 1A is a block diagram illustrates a wireless communication node simultaneously transmitting two signals at different frequencies through a passive device.

FIG. 1B depicts a frequency spectrum that illustrates PIM interference resulting from the transmission in FIG. 1A.

DETAILED DESCRIPTION

Figure 2:
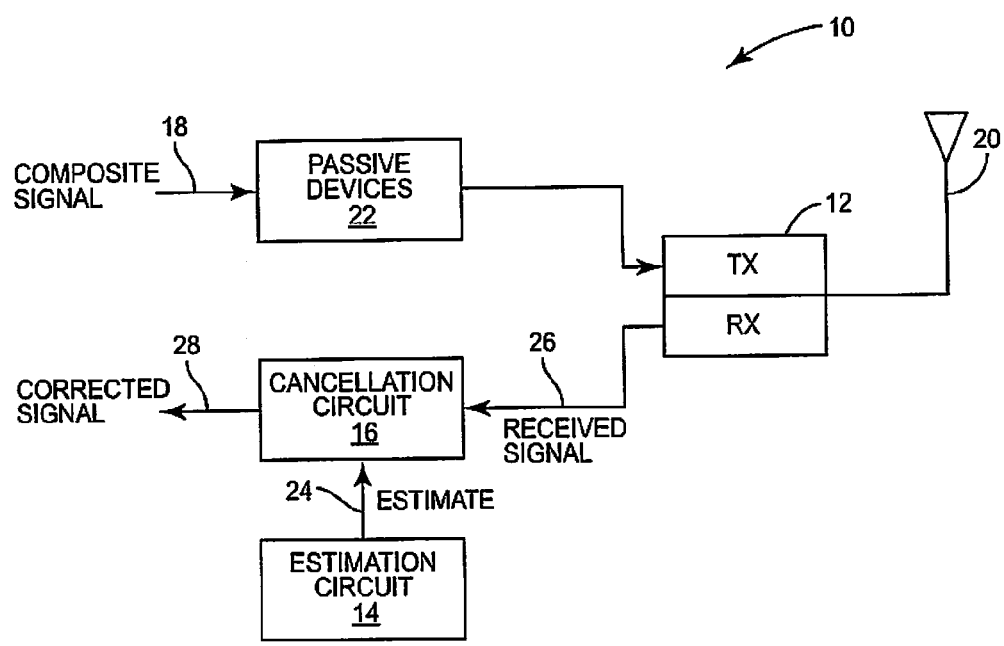
FIG. 2 is a block diagram of a wireless communication node configured to dynamically estimate and cancel PIM interference according to one or more embodiments.

FIG. 2 depicts a wireless communication node 10 according to one or more embodiments. The node 10 includes a transceiver 12, an estimation circuit 14, and a cancellation circuit 16.

The node 10 is configured to transmit a composite signal 18 through the transmit path of the transceiver 12, for wireless transmission via one or more antennas 20. This composite signal 18 includes multiple component signals of different frequencies. When such a composite signal 18 is transmitted, one or more passive devices 22 disposed in the transmit path generate passive intermodulation (PIM) that is coupled into the receive path of the transceiver 12 as interference.

The estimation circuit 14 is configured to dynamically estimate this PIM interference. Provided with an estimate 24 of the PIM interference, the cancellation circuit 16 correspondingly cancels the estimated PIM interference in the receive path. In some embodiments, for instance, the cancellation circuit 16 simply subtracts the PIM interference estimate 24 from the received signal 26, to obtain a corrected signal 28 with reduced PIM interference.

In some embodiments, the estimation circuit 14 dynamically estimates the PIM interference as a function of the composite signal 18. This way, the estimation circuit 14 effectively tracks the PIM interference as it changes over time due to variations in the particular composite signal 18. A number of different functions may be used in this regard, but in at least one embodiment the function includes one or more coefficients that model generation of PIM interference in the transmit path and coupling of PIM interference from the transmit path into the receive path. The coefficients therefore model those properties inherent to the node 10 that cause PIM interference, and remain independent of the particular composite signal 18 transmitted at any given time.

Figure 3A:
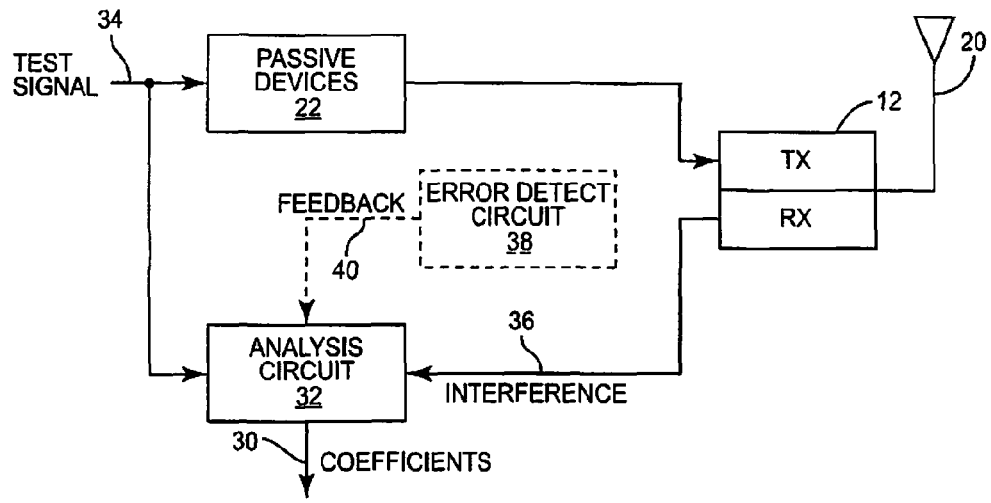
FIGS. 3A-3B are block diagrams of a wireless communication node that includes an analysis circuit according to one or more embodiments.
Figure 3B:
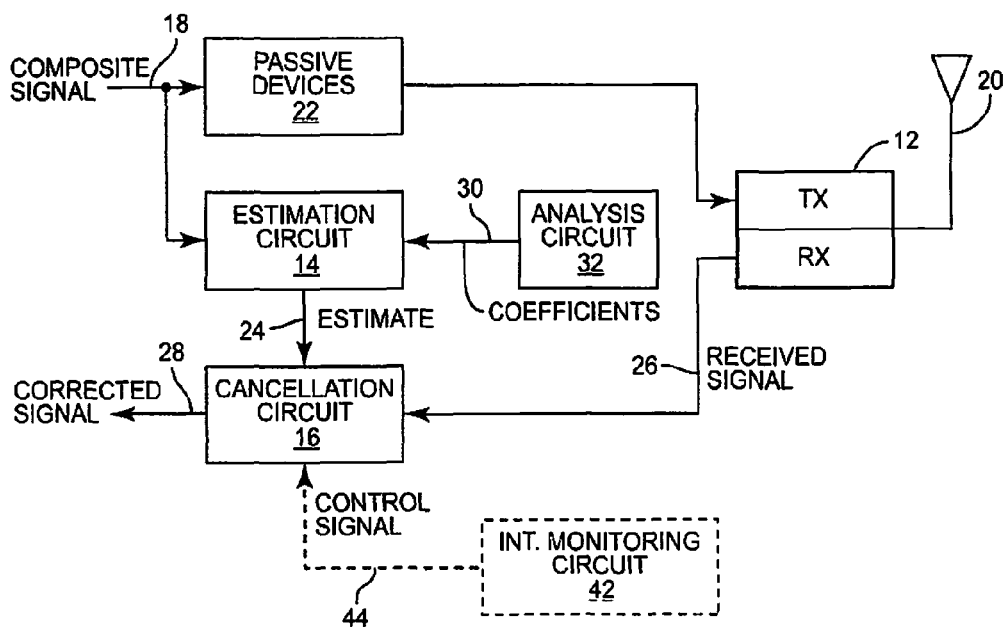

FIGS. 3A-3B illustrate one or more embodiments that use these coefficients for dynamically estimating and cancelling PIM interference. More particularly, FIG. 3A illustrates an embodiment for determining the coefficients, while FIG. 3B illustrates an embodiment for using those coefficients to estimate and cancel PIM interference.

In FIG. 3A, the node 10 determines the coefficients by transmitting a test signal 34 through the transmit path. This test signal 34 may include pilot symbols, user data symbols, control data symbols, or any other signal known to the node 10. Regardless, the node 10 specifically transmits this test signal 34 during a time (i.e., a test or analysis stage) in which the transceiver 12 is not scheduled to receive any signal. By transmitting the test signal 34 in this way, the node 10 generally isolates the effect of the test signal's transmission on the receive path, for measuring those properties inherent to the node 10 that cause PIM interference.

An analysis circuit 32 measures any interference 36 coupled into the receive path from the transmission of this test signal 34 through the transmit path. The analysis circuit 32 then uses its knowledge of the test signal 34 to estimate the one or more coefficients 30. That is, the analysis circuit 32 is configured to estimate the one or more coefficients 30 as a function of the test signal 34 and the measured interference 36. The analysis circuit 32 then provides these estimated coefficients 30 to the estimation circuit 14, for use in estimating the PIM interference that will be caused when the node 10 transmits the composite signal 18 at a later time.

As shown in FIG. 3B, the estimation circuit 14 uses the coefficients 30 previously determined by the analysis circuit 32 in the test stage to dynamically estimate the PIM interference caused by the later transmission of the composite signal

18. More particularly, the estimation circuit 14 dynamically estimates the PIM interference using a function of the composite signal 18 that models PIM interference generation and coupling in the node 10 according to the coefficients 30. The estimation circuit 14 provides this estimate 24 to the cancellation circuit 16, which cancels the estimated PIM interference from the received signal 26.

Note that the accuracy of the coefficients 30 in modelling PIM interference generation and coupling in the node 10 may diminish over time if the coefficients are not updated to reflect changes at the node 10. In particular, factors such as temperature, humidity, the time varying nature of the passive devices 22, and other changes at the node 10 that affect the transmit path and its coupling with the receive path in turn affect PIM interference generation and coupling at the node 10. According to one or more embodiments, therefore, the analysis circuit 32 is configured to occasionally or periodically update values of the one or more coefficients 30 (e.g., by transmitting another test signal 34) to reflect changes at the node 10. The particular times (e.g., intervals) at which the analysis circuit 32 updates the coefficients 30 may be adjusted from time to time, depending on one or more update interval parameters. Such parameters, for instance, may be associated with the various changes conditions at the node 10. In at least one embodiment, though, the analysis circuit 32 updates the coefficients 30 no more than once every few minutes.

Additionally or alternatively, the analysis circuit 32 may be configured to dynamically tune the actual process by which it determines coefficients 30. As one example of such tuning, the analysis circuit 32 may periodically adjust the number of coefficients 30 used to model PIM interference generation and coupling in the node 10. In this regard, the choice of how many coefficients 30 to use may depend on the particular configuration of the node 10 (e.g., the bandwidth of the node's receiver) and/or a balance between cancellation performance and computational cost.

In one embodiment, for example, the node 10 employs a receiver that provides a wideband signal. In this case, the analysis circuit 32 is configured to set the number of coefficients 30 to reflect the actual physical processes that cause the PIM interference.

In other practical embodiments, though, the node 10 employs a receiver with limited bandwidth and implements a filter for band-pass filtering. In this case, the analysis circuit 32 may simply set the number of coefficients 30 to reflect the number of signal observations available from sampling of the filter output. The number of coefficients 30 may be dynamically adjusted to be any number below the number of available signal observations, based on the balance struck between cancellation performance and computational cost.

In some embodiments, this balance dictates use of only the number of coefficients 30 required to capture the 3rd-order PIM components. Indeed, as noted above, the power of the 3rd-order PIM components is much higher than that of other components. Focusing on these 3rd-order components thereby provides sufficiently good performance in these embodiments, while reducing computational cost.

In other embodiments, the balance is dynamically struck based on the actual cancellation performance being achieved. As shown in FIG. 3A, for instance, the node 10 in these embodiments includes an error detection circuit 38. This error detection circuit 38 is configured to dynamically provide error detection feedback 40 to the analysis circuit 32, which uses that feedback 40 at least in part to adjust the number of coefficients 30 being used.

In at least one embodiment, for example, the analysis circuit 32 uses the feedback 40 to maximize cancellation performance while meeting defined computational cost thresholds. In this case, the error detection circuit 38 determines the extent to which cancelling PIM interference has decreased error rates, as compared to without PIM interference cancellation. The error detection circuit 38 may do so by performing error detection (e.g., cyclic redundancy checks) on demodulated versions of both the received signal 26 and the corrected signal 28, and then comparing the error rates detected. If the corrected signal 28 has a lower error rate than the received signal 26, then PIM interference cancellation has improved receiver performance. In this case, the analysis circuit 32 may incrementally increase the number of coefficients 30 being used, in an attempt to further improve receiver performance, up to a maximum number of coefficients 30 that defines a computational cost threshold. On the other hand, if the corrected signal 28 has a higher error rate than the received signal 28, then PIM interference cancellation has actually degraded receiver performance. In this case, the node 10 may discontinue PIM interference cancellation.

In another embodiment, the analysis circuit 32 uses the feedback 40 to minimize computational cost while meeting a defined cancellation performance target. In this case, the error detection circuit 38 determines the extent to which cancelling PIM interference has decreased error rates towards a target error rate that defines the performance target. The error detection circuit 38 in this case may again compare error rates detected for both the received signal 26 and the corrected signal 28, and discontinue PIM interference cancellation if the corrected signal 28 has a higher error rate than the received signal 26. However, if the corrected signal 28 has a lower error rate than the received signal 26, then the error detection circuit 38 is configured to compare the corrected signal's error rate to the target error rate. If the corrected signal's error rate is lower than the target error rate, the analysis circuit 32 incrementally decreases the number of coefficients 30 being used, until the target error rate is achieved. Conversely, if the corrected signal's error rate is higher than the target error rate, the analysis circuit 32 incrementally increases the number of coefficients 30 being used, until the target error rate is achieved.

In still other embodiments, the selection of the number of coefficients 30 is aided by a model selection criterion. Non-limiting examples include the Akaike information criterion (AIC) and the Bayesian information criterion.

In addition or alternatively to embodiments above that selectively apply PIM interference cancellation based on error rate feedback, other embodiments selectively apply PIM interference cancellation based on interference statistics. As shown in FIG. 3B, for example, an interference monitoring circuit 42 is configured to monitor statistics regarding a received interference level at the transceiver 12. The interference monitoring circuit 42 may then provide a control signal 44 to the cancellation circuit 16, the estimation circuit 14, and/or the analysis circuit 32 to control whether or not the node 10 dynamically estimates and cancels PIM interference.

More particularly, the interference monitoring circuit 42 is configured to monitor whether the received interference level exceeds a predefined threshold level and has a low variance. These interference statistics are characteristic of PIM interference, since such interference typically has a high power level and low variance. Thus, if the received interference level exceeds the threshold and has a low variance, the control signal 44 controls the node 10 to apply PIM interference cancellation. Otherwise, the control signal 44 controls the node 10 to refrain from applying PIM interference cancellation.

Figure 4:
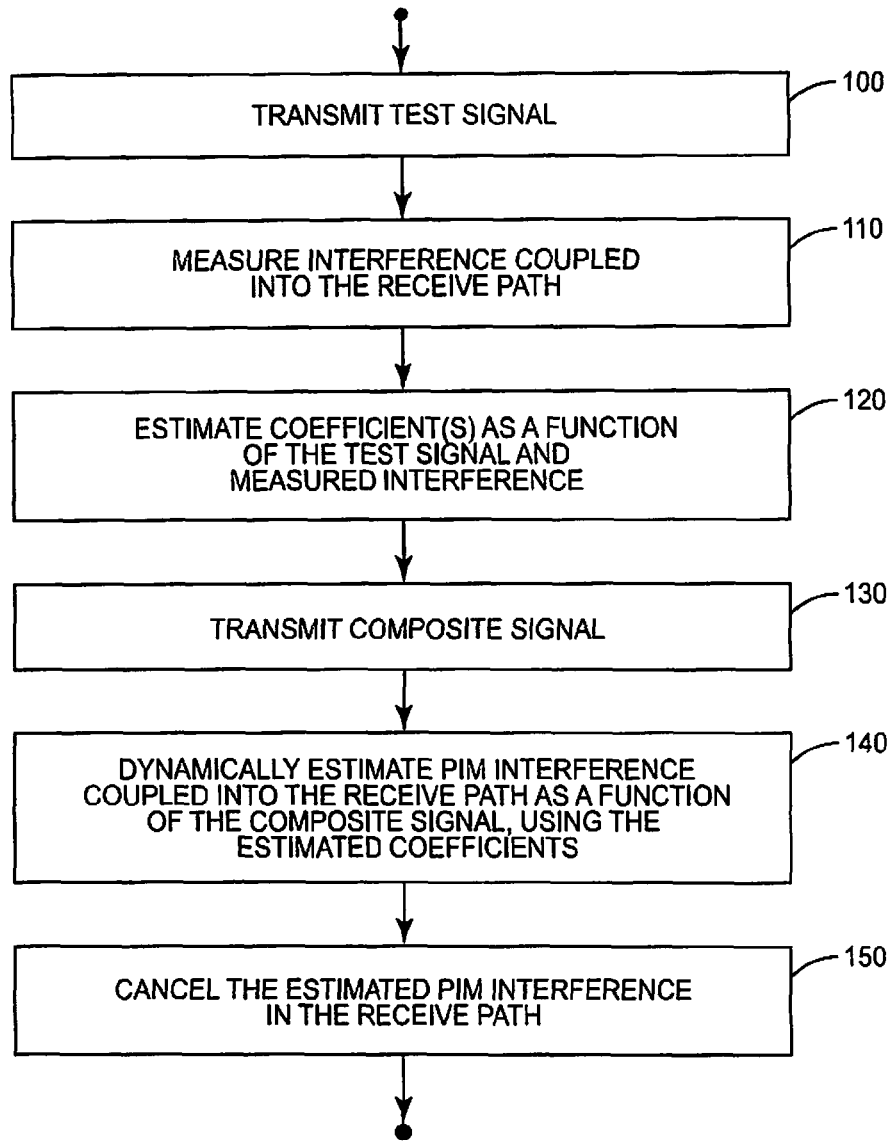
FIG. 4 is a logic flow diagram of a method for determining one or more coefficients used to dynamically estimate and cancel PIM interference, according to some embodiments.

Irrespective of the above modifications and variations, the node 10 of FIGS. 3A and 3B generally performs the processing illustrated in FIG. 4. As shown in FIG. 4, processing at the node 10 first includes transmitting a test signal 34 during a time at which the node 10 is not scheduled to receive any signal (Block 100). Processing then includes measuring the interference coupled into the receive path from the transmission of the test signal 34 through the transmit path (Block 110). Processing further includes estimating the one or more coefficients 30 as a function of the test signal 34 and the measured interference (Block 130).

Having estimated the coefficients 30, processing later includes transmitting a composite signal 18 through the transmit path. Processing then includes dynamically estimating the PIM interference coupled into the receive path using a function of the composite signal 18 that models PIM interference generation and coupling in the node 10 according to the coefficients 30 (Block 140). Finally, processing includes cancelling the estimated PIM interference in the receive path (Block 150).

Figure 5:
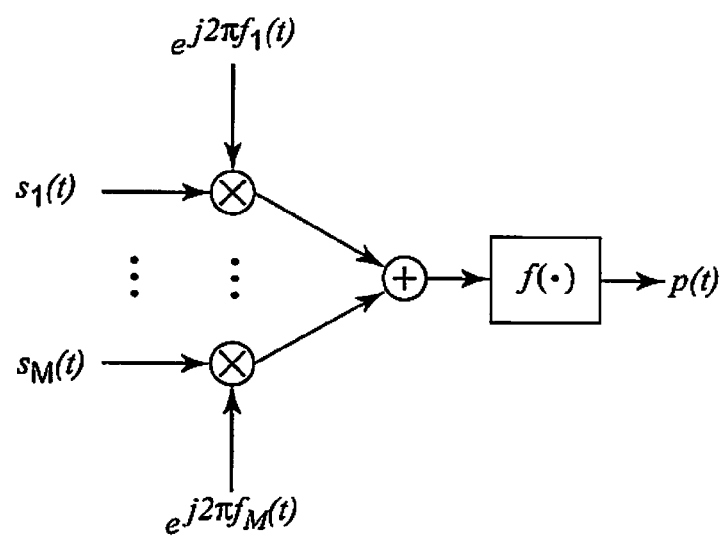
FIG. 5 is a system model of PIM interference according to one or more embodiments.

Although generically described above without regard to the particular function used to estimate the PIM interference, it is helpful to illustrate the process in the context of embodiments where the function is a polynomial with the composite signal as an independent variable and the one or more coefficients 30 as coefficients of the polynomial. FIG. 5 models the PIM interference in this regard.

As shown in FIG. 5, a number of component data signals $s_1(t), s_2(t), \ldots s_M(t)$ are modulated on frequencies $f_1, f_2, \ldots f_M$, respectively, and added together to form a composite signal $s_D(t)$. The signal $s_D(t)$ to be transmitted therefore is:

$$s_D(t) = \sum_i^M s_i(t) e^{j2\pi f_i t} \qquad (1)$$

When this signal $s_D(t)$ is transmitted through the transmit path, non-linear passive devices 22 generate PIM p(t) that is coupled into the receive path as interference. The generation of PIM p(t) is interpreted in this example as applying a multicarrier stimulus to the passive devices 22 that obey a polynomial model (e.g., the Taylor polynomial model). In this regard, assume that the memoryless non-linear response of the passive devices 22 is described by the following order-d polynomial:

$$p(t)=f[s_D(t)]=\alpha_1 s_D(t)+\alpha_2 s_D^2(t)+\ldots+\alpha_d s_D^d(t), \qquad (2)$$

where $f[s_D(t)]$ represents the PIM interference p(t) as a function $f[\ ]$ of the composite signal $s_D(t)$, and $\alpha_1, \ldots, \alpha_d$ represent the coefficients 30. Because $s_D(t)$ is exactly known at the wireless communication node 10, the PIM interference p(t) can be determined and cancelled if the polynomial coefficients $\alpha_1, \ldots, \alpha_d$ can be estimated.

As suggested above, the analysis circuit 32 estimates these polynomial coefficients $\alpha_1, \ldots, \alpha_d$ during the test stage. Specifically, the node 10 transmits a test signal s(t) during the test stage. Because the node 10 is not scheduled to receive during the test stage, any signal that is received can generally be attributed to PIM interference p(t) coupled into the receive path from the transmission of the test signal s(t). In this regard, the signal r(t) received at the node 10 during the test stage can be formulated as:

$$r(t)=\alpha_0+\alpha_1 s(t)+\alpha_2 s^2(t)+\ldots+\alpha_d s^d(t)+n(t) \qquad (3)$$

where n(t) is assumed to be Gaussian white noise with variance $\sigma_n^2$. The analysis circuit 32 samples this receive signal r(t) and obtains $$r_k=r(kT_s)=\alpha_0+\alpha_1 s_k+\alpha_2 s_k^2+\ldots+\alpha_d s_k^d+n_k, k=1,\ldots,N \qquad (4)$$

where $1/T_s$ is the sampling rate and the corresponding test signal samples $$s_k=s(kT_s), k=1,\ldots,N \qquad (5)$$

are exactly known at the node 10. Equivalently, equation (4) can be rewritten in a compact form:

$$\underbrace{\begin{pmatrix} r_1 \\ r_2 \\ \vdots \\ r_N \end{pmatrix}}_{r} = \underbrace{\begin{pmatrix} 1 & s_1 & s_1^2 & \cdots & s_1^d \\ 1 & s_2 & s_2^2 & \cdots & s_2^d \\ \vdots & \vdots & \ddots & & \vdots \\ 1 & s_N & s_N^2 & \cdots & s_N^d \end{pmatrix}}_{s} \underbrace{\begin{pmatrix} \alpha_0 \\ \alpha_1 \\ \vdots \\ \alpha_d \end{pmatrix}}_{\alpha} + \underbrace{\begin{pmatrix} n_1 \\ n_2 \\ \vdots \\ n_N \end{pmatrix}}_{n}. \qquad (6)$$

Having sampled the receive signal r(t) in this way, the analysis circuit 32 obtains an estimate $\bar{\alpha}$ for the polynomial coefficients $\alpha$. In one embodiment, for example, a least squares (LS) estimator at the analysis circuit 32 estimates the polynomial coefficients $\alpha$ as:

$$\bar{\alpha}=(S^H S)^{-1} S^H r \qquad (7)$$

where $(\bullet)^H$ denotes the conjugate transpose. In embodiments where the pattern of the test signal s(t) is fixed, the part of $(S^H S)^{-1} S^H$ can be computed in advance and stored at the node 10 to avoid frequent matrix inverse operations.

Note that, for numerical or other implementation reasons, the least squares estimation in the above may not be computed literally, as the respective mathematical equations indicate. In particular, solving the equations shown above involves high-cost matrix inversions. In at least one embodiment, therefore, the analysis circuit 32 utilizes QR or SVD decomposition to avoid explicitly performing matrix inversions.

Furthermore, some embodiments employ more general versions of least squares estimation. One embodiment, for instance, utilizes regularization in calculating the polynomial coefficient estimate $\bar{\alpha}$ as:

$$\bar{\alpha}=(S^H S+\sigma^2 I)^{-1} S^H r, \qquad (8)$$

where $\sigma^2$ is a regularization parameter and I is an identity matrix. This embodiment improves numerical stability.

Another embodiment applies a weighted least squares solution, to calculate the polynomial coefficient estimate $\bar{\alpha}$ as:

$$\bar{\alpha}=(S^H W S+\sigma^2 I)^{-1} S^H r \qquad (9)$$

where W is a diagonal matrix containing weighting coefficients for different samples $s_k$. These weighting coefficients can be deployed to account for different interference characteristics.

Regardless of the particular manner in which the polynomial coefficient estimate $\bar{\alpha}$ is obtained, the analysis circuit 32 provides these estimated coefficients $\bar{\alpha}$ to the estimation circuit 14. Then, later, when the composite data signal $s_D(t)$ is transmitted, the estimation circuit 14 uses the estimated coefficients $\bar{\alpha}$ and knowledge of the composite signal $s_D(t)$ to compute an estimate 24 of the PIM interference $\bar{p}(t)$:

$$\bar{p}(t)=\bar{\alpha}_1 s_D(t)+\bar{\alpha}_2 s_D^2(t)+\ldots+\bar{\alpha}_d s_D^d(t) \qquad (10)$$

The cancellation circuit 16 correspondingly obtains the corrected signal $\bar{r}_u(t)$ by cancelling the estimated PIM interference $\bar{p}(t)$ from the received signal $r_u(t)$. That is, the cancellation circuit 16 obtains:

$$\bar{r}_u(t) = r_u(t) - \bar{p}(t) \quad (11)$$

The corrected signal $\bar{r}_u(t)$ is then fed to a processing unit for decoding.

Embodiments herein thereby effectively suppress time-varying PIM interference to improve receiver performance. Although the embodiments have been discussed in general terms with regard to a wireless communication node 10, those skilled in the art will appreciate that the node 10 may be a base station or other node in a wireless communication system that transmits a composite signal through passive devices, e.g., at relatively high transmit power. Similarly, no particular communication standards are necessary for practicing the embodiments. The system may therefore comprise any wideband communication system, such as those based on E-UTRA, and/or employ technologies such as MSR-NC and CA.

Those skilled in the art will also appreciate that the various circuits described may refer to a combination of analog and digital circuits, including one or more processors configured with software stored in memory and/or firmware stored in memory that, when executed by the one or more processors, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Figure 6:
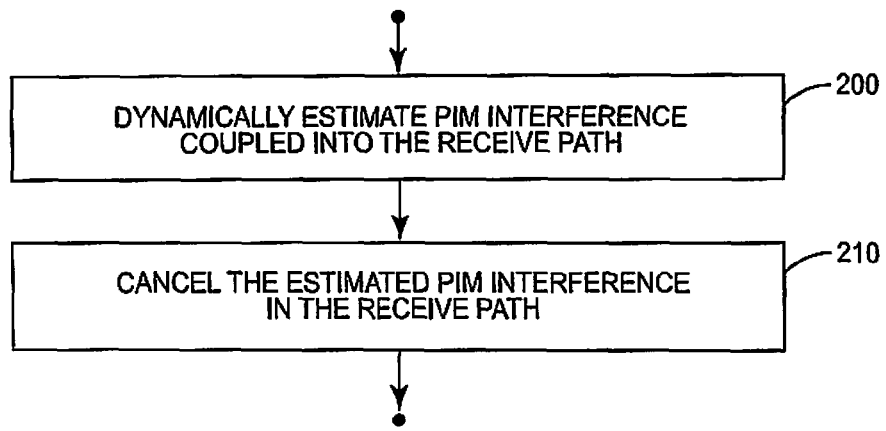
FIG. 6 is a logic flow diagram of a method for dynamically estimating and cancelling PIM interference according to one or more embodiments.

In view of the modifications and variations described above, those skilled in the art will generally appreciate that a wireless communication node 10 herein generally performs the processing shown in FIG. 6. As shown in FIG. 6, processing includes dynamically estimating PIM interference coupled into the receive path of a transceiver 12 from the transmission of a composite signal 18 through the transmit path of the transceiver 12 (Block 200). Processing then includes cancelling the estimated PIM interference in the receive path (Block 210).

Such processing has proven effective in a computer simulation described below. The computer simulation assumes a system transmitting signals on two frequencies $f_1 = 0.9$ MHz and $f_2 = 1$ MHz, both with bandwidth $B1 = B2 = 5$ kHz. A sampling rate $f_s = 2$ MHz is used. To simulate two random wideband transmit signals on two bands, the simulation draws discrete frequency domain values from a standard Gaussian distribution. Moreover, the simulation uses the following 5th-order polynomial to simulate the generation of PIM:

$$f(s_k) = s_k + 0.6 s_k^2 + 2 s_k^3 + 0.4 s_k^4 + 0.2 s_k^5, k = 1, \ldots, N \quad (12)$$

The simulation also adds Gaussian white noise to the time-domain samples, i.e.

$$r_k = f(s_k) + n_k, k = 1, \ldots, N \quad (13)$$

where $n_k$ is a Gaussian sequence with zero mean and standard deviation $\sigma$.

Figure 7A:
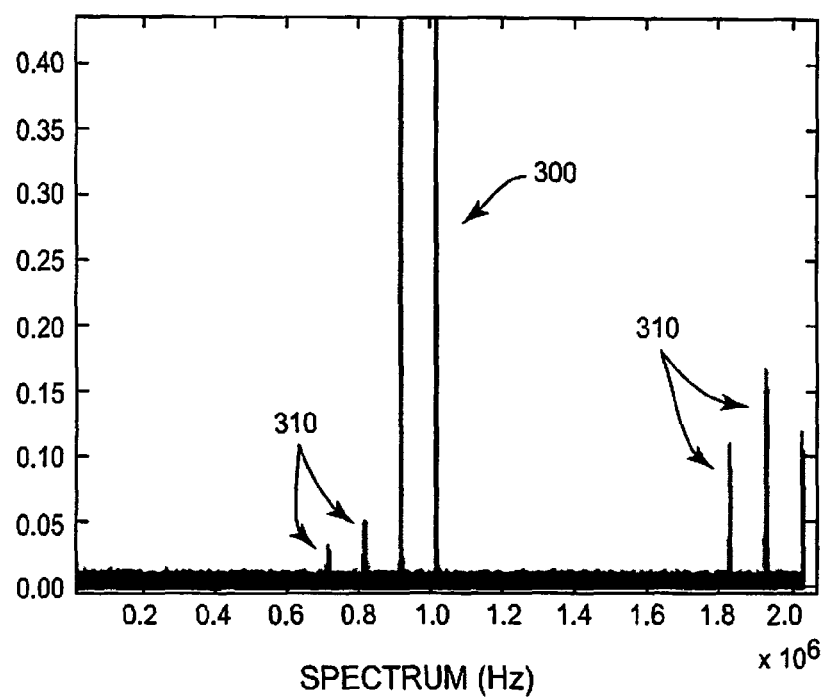
FIGS. 7A and 7B are frequency spectrums that illustrate the effects of dynamically estimating and cancelling PIM interference using one or more embodiments.
Figure 7B:
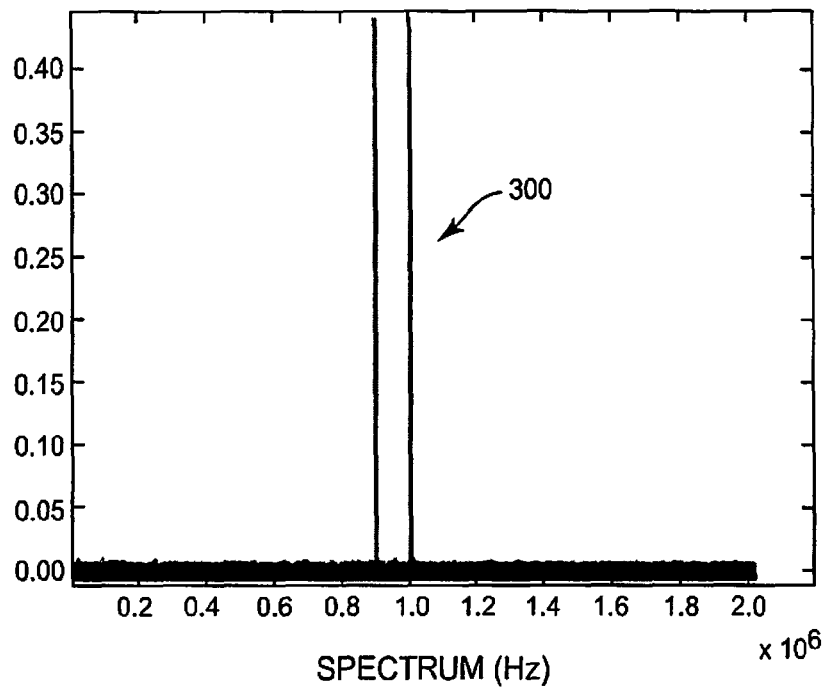

FIGS. 7A-7B illustrate the effects of employing the dynamic estimation and cancellation of PIM interference in the case that the node 10 does not employ a receive filter. Specifically, FIG. 7A illustrates the spectrum of transmitted signals 300 as well as the PIM components 310, before PIM interference cancellation. FIG. 7B illustrates, by contrast, the spectrum after PIM interference cancellation. The PIM interference components 310 are effectively suppressed by using a true polynomial order of 5 and $N_f = 2000$ samples of the received signal for LS estimation of the PIM interference.

Now consider a practical case in which the node 10 employs a Finite Impulse Response (FIR) filter for band-pass filtering. A 5th order FIR filter is used with coefficients b=[0.0935, −0.3765, 0.3298, 0.3298, −0.3765, 0.0935].

The simulation focuses on the [0.7925, 0.8075] MHz band, which is the assumed receiver band. Since this is the only observable received signal, a 3rd-order polynomial is assumed in the test stage, i.e. d=3 in equation (10). Note, in this test case, the polynomial order of the physical PIM process and that of the analysis circuit 32 and estimation circuit 14 are different.

Figure 8:
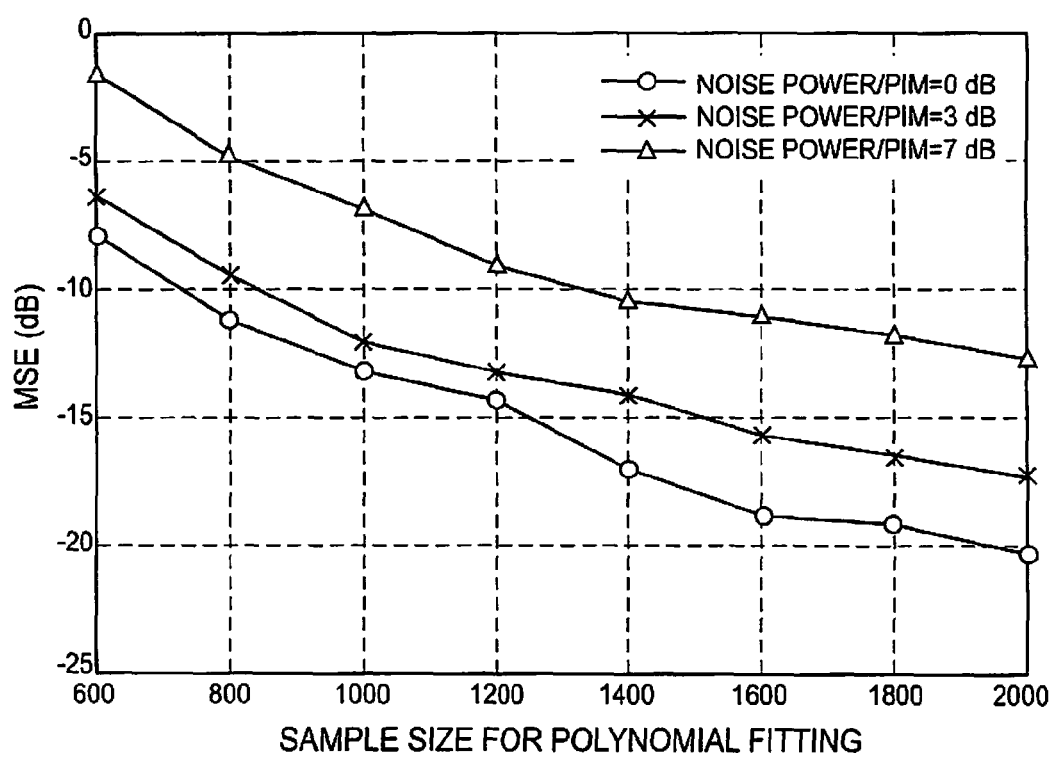
FIG. 8 is a line graph illustrating the performance of one or more embodiments herein under different noise environments.

FIG. 8 shows the relationship between the Mean-Square Error (MSE) of the spectral estimation of the PIM components on the [0.7925, 0.8075] MHz band and the sample size for LS fitting. Observe that, for different noise environments (where the mean power of the PIM is 0, 3, 7 dB lower than white noise), the embodiments herein achieve good performance in terms of estimating PIM interference (and therefore PIM cancellation) for reasonable sample size.

Those skilled in the art will of course recognize that the present invention may be carried out in other ways than those specifically set forth herein without departing from essential characteristics of the invention. The present embodiments are thus to be considered in all respects as illustrative and not restrictive, and all changes coming within the meaning and equivalency range of the appended claims are intended to be embraced therein.

What is claimed is:

1. A wireless communication node comprising:
a transceiver with a transmit path and a receive path;
an estimation circuit configured to dynamically estimate passive intermodulation (PIM) interference coupled into the receive path from the transmission of a particular composite signal through the transmit path, wherein the particular composite signal includes component signals of different frequencies, wherein the estimation circuit is configured to dynamically estimate the PIM interference as a function of the particular composite signal, wherein said function includes one or more coefficients that model properties inherent to the node that cause generation of PIM interference in the transmit path and coupling of PIM interference from the transmit path into the receive path, wherein the one or more coefficients are independent of the particular composite signal; and
a cancellation circuit configured to cancel the estimated PIM interference in the receive path.

2. The wireless communication node of claim 1, further comprising an analysis circuit configured to determine the one or more coefficients by:
measuring interference coupled into the receive path from the transmission of a test signal through the transmit path during a time in which the transceiver is not scheduled to receive any signal; and
estimating the one or more coefficients as a function of the test signal and the measured interference.

3. The wireless communication node of claim 2, wherein the analysis circuit is configured to obtain an estimate of each of said one or more coefficients $\bar{\alpha}_1, \ldots, \bar{\alpha}_d$ by solving $r_k = r(kT_s) = \alpha_0 + \alpha_1 s_k + \alpha_2 s_k^2 + \ldots + \alpha_d s_k^d + n_k$, $k = 1, \ldots, N$ for the coefficients $\alpha_1, \ldots, \alpha_d$, where $1/T$ is the sampling rate at which the analysis circuit samples a receive signal $r(t)$ received at the wireless communication node during said time in which the transceiver is not scheduled to receive any signal, where the corresponding samples of the test signal $s(t)$ are $s_k = s(kT_s)$, $k = 1, \ldots, N$, where those samples $s_k$ are exactly known at the wireless communication node, and where $n_k$ are the corresponding samples of Gaussian white noise $n(t)$ in the receive signal with variance $\sigma_n^2$.

4. The wireless communication node of claim 1, further comprising an analysis circuit configured to periodically update values of the one or more coefficients to reflect adjustments to the transmit path.

5. The wireless communication node of claim 1, further comprising an analysis circuit configured to periodically adjust the number of said coefficients.

6. The wireless communication node of claim 5, further comprising an error detection circuit configured to determine the extent to which previous cancellation of estimated PIM interference has decreased error rates.

7. The wireless communication node of claim 5, further comprising an error detection circuit configured to determine the extent to which cancelling estimated PIM interference has decreased error rates towards a target error rate, and wherein said adjustment is at least partly based on that determination.

8. The wireless communication node of claim 1, wherein said function is a polynomial with the particular composite signal as an independent variable and the one or more coefficients as coefficients of the polynomial.

9. The wireless communication node of claim 1, further comprising an interference monitoring circuit configured to monitor statistics regarding a received interference level at the transceiver and wherein the cancellation circuit is configured to selectively cancel PIM interference in the receive path depending on said statistics.

10. The wireless communication node of claim 9, wherein the cancellation circuit is configured to selectively cancel PIM interference by cancelling PIM interference if the statistics indicate the received interference level exceeds a predefined threshold level and has low variance, and refraining from cancelling PIM interference if the statistics indicate otherwise.

11. The wireless communication node of claim 1, wherein the estimation circuit is configured to dynamically estimate the PIM interference coupled into the receive path as $\vec{p}(t)=f[s_D(t)]=\vec{\alpha}_1 s_D^2(t)+\vec{\alpha}_2 s_D^2(t)+\ldots+\vec{\alpha}_d s_D^d(t)$, where $f[s_D(t)]$ represents the estimated PIM interference $\vec{p}(t)$ as a function $f[\ ]$ of the particular composite signal $s_D(t)$, and $\vec{\alpha}_1,\ldots,\vec{\alpha}_d$ represent said one or more coefficients.

12. A method implemented by a wireless communication node that includes a transceiver, the method comprising:
dynamically estimating passive intermodulation (PIM) interference coupled into the receive path of the transceiver from the transmission of a particular composite signal through the transmit path of the transceiver, wherein the particular composite signal includes component signals of different frequencies, wherein said dynamically estimating comprises dynamically estimating the PIM interference as a function of the particular composite signal, wherein said function includes one or more coefficients that model properties inherent to the node that cause generation of PIM interference in the transmit path and coupling of PIM interference from the transmit path into the receive path, wherein the one or more coefficients are independent of the particular composite signal; and
cancelling the estimated PIM interference in the receive path.

13. The method of claim 12, further comprising determining the one or more coefficients by:
transmitting a test signal through the transmit path during a time in which the transceiver is not scheduled to receive any signal;
measuring interference coupled into the receive path from the transmission of the test signal; and
estimating the one or more coefficients as a function of the test signal and the measured interference.

14. The method of claim 13, wherein estimating the one or more coefficients comprises obtaining an estimate of each of said one or more coefficients $\bar{\alpha}_1,\ldots,\bar{\alpha}_d$ by solving $r_k=r(kT_s)=\alpha_0+\alpha_1 s_k+\alpha_2 s_k^2+\ldots+\alpha_d s_k^d+n_k$, $k=1,\ldots,N$ for the coefficients $\alpha_1,\ldots,\alpha_d$, where $1/T_s$ is the sampling rate at which the analysis circuit samples a receive signal $r(t)$ received at the wireless communication node during said time in which the transceiver is not scheduled to receive any signal, where the corresponding samples of the test signal $s(t)$ are $s_k=s(kT_s)$, $k=1,\ldots,N$, where those samples $s_k$ are exactly known at the wireless communication node, and where $n_k$ are the corresponding samples of Gaussian white noise $n(t)$ in the receive signal with variance $\sigma_n^2$.

15. The method of claim 12, further comprising periodically updating values of the one or more coefficients to reflect changes at the wireless communication node.

16. The method of claim 12, further comprising periodically adjusting the number of said coefficients.

17. The method of claim 16, wherein said adjustment is at least partly based on the extent to which previous cancellation of estimated PIM interference has decreased error rates.

18. The method of claim 16, wherein said adjustment is at least partly based on the extent to which cancelling estimated PIM interference has decreased error rates towards a target error rate.

19. The method of claim 12, wherein said function is a polynomial with the particular composite signal as an independent variable and the one or more coefficients as coefficients of the polynomial.

20. The method of claim 12, further comprising monitoring statistics regarding a received interference level at the transceiver and selectively cancelling PIM interference in the receive path depending on said statistics.

21. The method of claim 20, wherein said selectively cancelling comprises cancelling PIM interference if the statistics indicate the received interference level exceeds a predefined threshold level and has low variance, and refraining from cancelling PIM interference if the statistics indicate otherwise.

22. The method of claim 12, wherein said dynamically estimating comprises dynamically estimating the PIM interference coupled into the receive path as $\bar{p}(t)=f[s_D(t)]=\bar{\alpha}_1 s_D(t)+\bar{\alpha}_2 s_D^2(t)+\ldots+\bar{\alpha}_d s_D^d(t)$, where $f[s_D(t)]$ represents the estimated PIM interference $\bar{p}(t)$ as a function $f[\ ]$ of the particular composite signal $s_D(t)$, and $\bar{\alpha}_1,\ldots,\bar{\alpha}_d$ represent said one or more coefficients.

* * * * *

UNITED STATES PATENT AND TRADEMARK OFFICE
CERTIFICATE OF CORRECTION

PATENT NO. : 9,026,064 B2  Page 1 of 1
APPLICATION NO. : 13/319556
DATED : May 5, 2015
INVENTOR(S) : Wang et al.

It is certified that error appears in the above-identified patent and that said Letters Patent is hereby corrected as shown below:

In the specification

In Column 7, Line 49, in Equation (2), delete "$a_1s_D(t)$" and insert -- $\alpha_1 s_D(t)$ --, therefor.

In the claims

In Column 10, Line 62, in Claim 3, delete "1/T is" and insert -- $1/T_s$ is --, therefor.

In Column 11, Line 40, in Claim 11, delete "$\overline{\alpha}_1 s_D{}^2(t) + \vec{\alpha}_2 s_D{}^2(t) + \ldots + \vec{\alpha}_d s_D{}^d(t),$" and insert -- $\overline{\alpha}_1 s_D(t) + \overline{\alpha}_2 s_D^2(t) + \cdots + \overline{\alpha}_d s_D^d(t),$ --, therefor.

In Column 12, Line 16, in Claim 14, delete "1/T is" and insert -- $1/T_s$ is --, therefor.

Signed and Sealed this
Twenty-fourth Day of November, 2015

Michelle K. Lee
*Director of the United States Patent and Trademark Office*